United States Patent
Wiley et al.

[11] 3,727,268
[45] Apr. 17, 1973

[54] METHOD AND APPARATUS FOR SUPPLYING PRESSURIZED MEAT MATERIALS FOR FILLING A CASING

[76] Inventors: Ronald O. Wiley, 2086 Middlebrook Road, Torrance, Calif.; Edward A. Urman, 6727 Garth, Los Angeles, Calif. 90056

[22] Filed: Mar. 3, 1971

[21] Appl. No.: 120,557

[52] U.S. Cl. ...................................................... 17/35
[51] Int. Cl. ........................................... A22c 11/02
[58] Field of Search ............... 17/35, 37; 417/247, 417/390, 410; 222/63, 333

[56] References Cited

UNITED STATES PATENTS

| | | | |
|---|---|---|---|
| 3,034,171 | 5/1962 | Rosenthaler | 17/35 |
| 3,537,129 | 11/1970 | Orloff et al. | 17/35 |
| 3,601,845 | 8/1971 | Mavrich | 17/35 |

*Primary Examiner*—Lucie H. Laudenslager
*Attorney*—John P. Scholl, George J. Netter and Kendrick, Subkow & Kriegel

[57] ABSTRACT

Positive displacement pump for delivering pressurized meat materials to casing filling apparatus is powered by a stallable drive means, such that on changing the casing neither recycling of the pumped materials nor affirmative disconnection of driving power is required.

5 Claims, 1 Drawing Figure

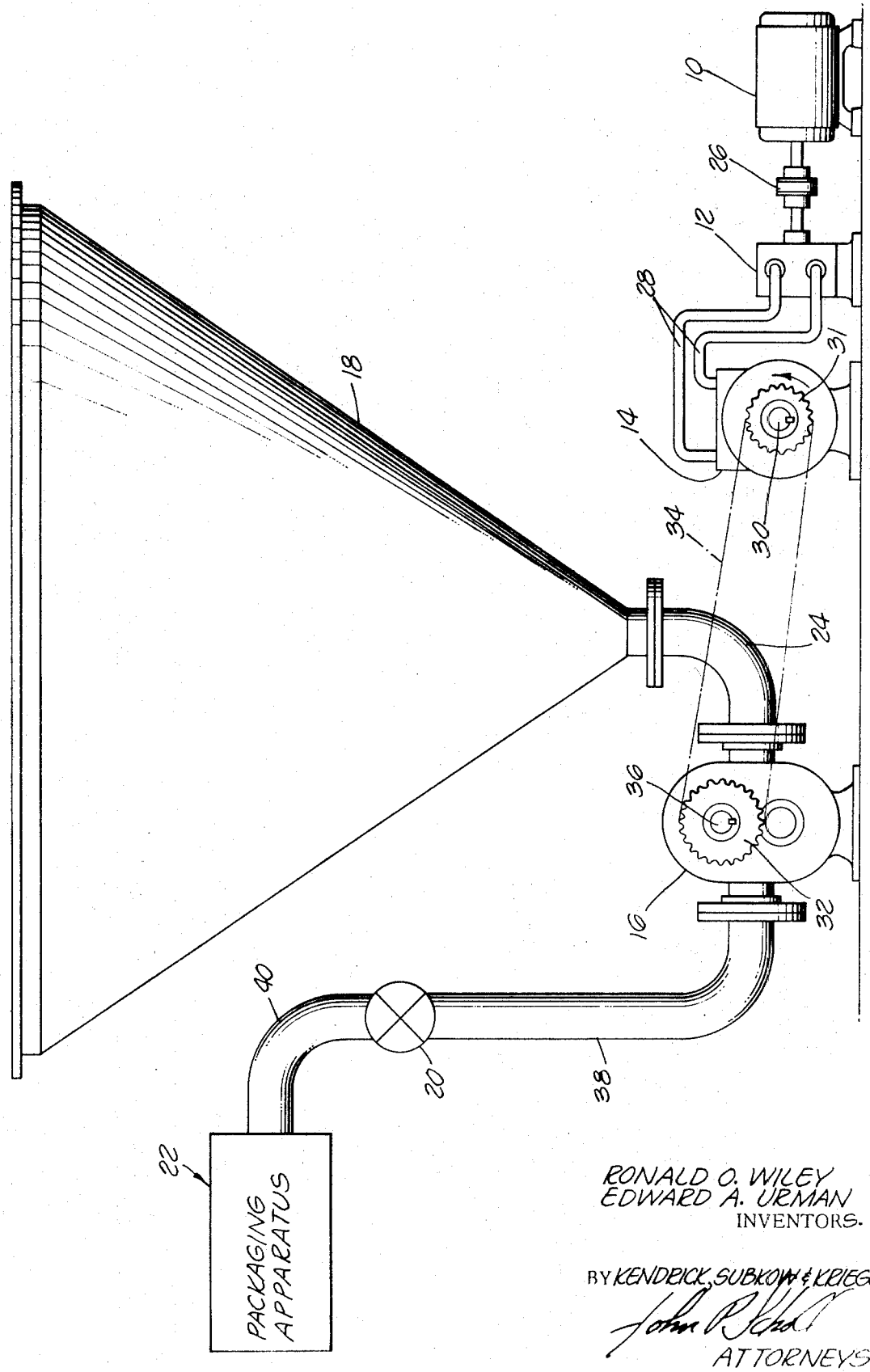

3,727,268

METHOD AND APPARATUS FOR SUPPLYING PRESSURIZED MEAT MATERIALS FOR FILLING A CASING

BACKGROUND OF THE INVENTION

The present invention relates to method and apparatus for supplying finely ground meat materials to a packaging apparatus so that the meat materials may be inserted into a casing or covering material.

Certain types of prepared meats such as frankfurters and bologna, for example, are made up of finely ground mixtures of meat, fat and various other ingredients. The consuming public has been conditioned to expect these products to be packaged in cylindrical-shaped casings, and in order to satisfy this consumer demand as well as to facilitate the handling and slicing of the particular products, bologna and frankfurters have traditionally been sold in this type of package.

To fill the casing in the past, the meat mixture was forced into the packaging apparatus through a funnel and thence into the casing. Due to the physical configuration of the casing, i.e., the tubular shape, there has been no completely satisfactory means for effecting continuous filling. In the usual operation of known packaging apparatus, a casing of a determined length is inserted onto a funnel or horn and the meat mixture is pumped into the casing which is gradually filled in its entire length. When filled, it is removed and a new casing is inserted onto the horn or funnel. The flow of meat mixture must be terminated during this refilling of the packaging apparatus, i.e., while a filled casing is being removed and an unfilled casing placed on the apparatus.

In the past, two means of discontinuing the flow of the meat product to the packaging apparatus have been utilized, among others:

1. The use of a bypass valve whereby the meat products were recycled to the storage or feed hopper and again pumped to the packaging apparatus. This recycling of the meat product is not entirely satisfactory as certain portions of the mixture are worked and reworked due to the recycling, which has an overall undesirable effect on the consistency of finished products, or 2. The entire pumping system has been shut down to relieve the flow of the material during replacement of the casing material. This method has the disadvantage that in many instances the meat material overruns or overflows the casing thereby causing wastage of the material and inefficient operation of the packaging apparatus. Occasionally air is admitted into the pumping system by this technique which disrupts the flow of the meat material and the general operation of the packaging apparatus.

OBJECTS AND SUMMARY OF THE INVENTION

It is a primary object of the present invention to provide an improved method and apparatus for use in the intermittent filling of casing with meat mixtures.

A further object of the invention is to provide a method and apparatus for substantially instantaneously supplying or discontinuing the supply of meat mixture to a packaging apparatus.

Other and further objects of this invention become apparent upon examination of the detailed operation of the method and apparatus of this invention hereinafter described.

In accordance with the present invention, the meat mixture to be supplied the packaging apparatus is disposed in a hopper and fed along a gravity path to a positive displacement pump. The pump forces the material through a shutoff valve to the packaging apparatus. The positive displacement pump is operated by a hydraulic motor which is, in turn, driven by pressurized fluid supplied from a hydraulic pump driven by an electric motor.

DESCRIPTION OF THE DRAWING

The drawing of the present invention is a side elevation view of apparatus for practicing the method of the present invention.

DESCRIPTION OF A PREFERRED EMBODIMENT

Referencing the drawing for the meat mixture supplying apparatus of this invention, the following major elements are shown, an electric motor 10, a hydraulic pump 12, a hydraulic drive unit 14, a meat mixture pump 16 of a positive displacement type, a storage hopper 18, a shutoff valve 20, and packaging apparatus 22.

Several types of positive displacement pumps have been found satisfactory to pressurize and deliver the meat mixture product to the packaging apparatus in accordance with this invention, however, it has been found that a positive displacement pump such as the Ulrich Models 65 and 125 manufactured and sold by Ulrich Manufacturing Co., Roanoke, Ill., work very satisfactorily in the apparatus of the present invention.

To operate the apparatus with the method of this invention, the meat mixture is placed in storage hopper 18 and by the force of gravity proceeds to the bottom of the hopper and into a pipe 24 and thence to the pump 16. Electric motor 10 is energized and drives hydraulic pump 12 through a suitable coupling 26. Pressurized fluid from the output side of hydraulic pump 12 is delivered to the hydraulic drive unit or motor 14 via conduiting 28 which causes a shaft 30 to rotate. Sprocket 31 is keyed to the shaft 30 and is thereby rotated, and, in turn, delivers power to a further sprocket 32 by means of continuous drive chain 34. The sprocket 32 is keyed to and drives shaft 36 of the positive displacement pump 16. The rotation of pump shaft 36 pressurizes the meat mixture and forces it out through a pipe 38, shutoff valve 20 and pipe 40 to packaging apparatus 22.

When it becomes necessary in the operation of the packaging apparatus 22 to interrupt the flow of meat material to the packaging apparatus to insert a new casing, the shutoff valve 20 is closed which immediately interrupts the flow of the meat material to the packaging apparatus. Due to the nature of the hydraulic drive of the meat mixture pump, electric motor 10 can continue to operate while shutoff valve 20 is closed. With the valve 20 closed, the positive displacement pump 16 is stalled and this, in turn, prevents the hydraulic motor shaft 30 from rotating. However, since the drive pump 12 for the stalled motor 14 is fluid operated, it will allow the shaft 30 to remain stationary without putting an undue load on the electric motor 10 which is still turning.

When the packaging apparatus has been resupplied with a casing, shutoff valve 20 is again opened and the meat material flows again through the pipe 40 to packaging apparatus 22 to fill the casing. Therefore, in the practice of the present invention, the meat materials in the feed pipe 38 are maintained under a substantially continuous and constant pressure head with interruption of filling for casing change not requiring either recycling of the meat materials or turning off of the pumping apparatus.

Although the drive means for the positive displacement pump 16 has been described as a hydraulic motor 14, it is contemplated that other types of stallable drive means may be used. For example, instead of the hydraulic motor 14 an electric motor or other conventional drive power source might be interconnected to the pump 16 via a slip clutch that would disconnect when subjected to a back torque exceeding some predetermined magnitude, e.g., when the valve 20 is closed. The essential point is that neither recycling of the meat materials nor affirmative starting and stopping of the power drive is needed when a stallable drive for the pump 16 is used.

We claim:

1. Apparatus for delivering a pressurized quantity of prepared meat materials to a casing filling means, comprising:
    a storage hopper for including a supply of said prepared meat materials;
    a positive displacement pump connected with said hopper for receiving said prepared meat materials therefrom;
    stallable drive means connected to said displacement pump providing a continuous driving torque to said pump; and
    a selectively actuatable valve interrelating the pump output and casing filling means, said valve when in the open state passing pressurized meat materials and when in the closed state interrupting flow of said pressurized meat materials thereby inducing sufficient back pressure on said drive means to produce stalling.

2. Apparatus as in claim 1, in which said drive means includes a continuously running electric motor, a hydraulic pump driven by said electric motor, and a hydraulic motor powered by pressurized fluid from the hydraulic pump, said hydraulic motor connected to drive the positive displacement pump.

3. In apparatus for intermittently providing a pressurized supply of prepared meat materials to a casing filling horn including a positive displacement pump, the improvement comprising:
    a continuously actuated hydraulic drive motor operatively connected to said displacement pump whereby said displacement pump produces an output pressure during filling and non-filling of a casing.

4. Apparatus for delivering prepared meat materials to a casing to fill the same, which comprises:
    means for pumping the prepared meat materials along a filling conduit to the casing;
    means for selectively valving the conduit to fill a casing with meat materials and to replace filled casings with unfilled casings; and
    maintaining pumping pressure on the meat materials during replacing of filled casings with unfilled casings while discontinuing pumping of said materials along said conduit.

5. Apparatus for providing prepared meat materials to an open-ended horn to fill a casing, which comprises:
    means for providing a supply of said materials at a predetermined gravity head;
    means for positively displacing said materials along a conduit to said horn at an increased pressure; and
    means for interrupting the positive displacement of said materials to change casings while maintaining said materials at said increased pressure.

* * * * *